United States Patent [19]

Nozawa

[11] 4,401,907
[45] Aug. 30, 1983

[54] ELECTRIC MOTOR COIL ELEMENT AND METHOD OF MANUFACTURING THE SAME

[75] Inventor: Yoshikuni Nozawa, Chino, Japan

[73] Assignee: Entac Co., Ltd., Suwa, Japan

[21] Appl. No.: 139,725

[22] Filed: Apr. 14, 1980

[30] Foreign Application Priority Data

Apr. 21, 1979 [JP] Japan .................................. 54/49573
Sep. 29, 1979 [JP] Japan ................................ 54/125643
Sep. 29, 1979 [JP] Japan ................................ 54/125644
Sep. 29, 1979 [JP] Japan ................................ 54/125645
Sep. 29, 1979 [JP] Japan ................................ 54/125646
Sep. 29, 1979 [JP] Japan ................................ 54/125647
Sep. 29, 1979 [JP] Japan ................................ 54/125648

[51] Int. Cl.³ ............................................. H02K 3/04
[52] U.S. Cl. .................................... 310/203; 29/596;
29/598; 336/225
[58] Field of Search ............... 310/268, 213, 198, 203,
310/205, 206, 207, 208, 180, 184; 336/187, 225;
174/34; 29/596, 598

[56] References Cited
FOREIGN PATENT DOCUMENTS 1032345 6/1966 United Kingdom .
1344144 1/1974 United Kingdom .

Primary Examiner—A. T. Grimley
Assistant Examiner—Morris Ginsburg
Attorney, Agent, or Firm—Frishauf, Holtz, Goodman & Woodward

[57] ABSTRACT

An electric motor coil element embodying this invention is manufactured by the steps of closely winding a single wire about a columnar bobbin to provide a cylindrical original winding having a diameter d, setting a 2n number of equal division points on the periphery of said cylindrical original winding to divide said periphery into equal parts, specifying the bending lines which pass through the equal division points at prescribed angles $\phi_1$ and $\phi_2$ to the reference lines which are set in parallel with the axis of said cylindrical original winding and pass through said equal division points, and bending the segments of said original cylindrical winding is such a manner that said bending lines project alternately inward and outward along the periphery of an imaginary block form having a prescribed shape.

33 Claims, 17 Drawing Figures

ELECTRIC MOTOR COIL ELEMENT AND METHOD OF MANUFACTURING THE SAME

BACKGROUND OF THE INVENTION

This invention relates to an electric motor coil element and a method of manufacturing the same.

Various electric motors are in use such as the moving-coil, coreless, slotless and brushless types. The rotor or stator of these motors is generally constructed by winding an electrically conductive wire around the peripheral surface of a cylindrical body. Among the motors comprising such rotor or stator is a disk type motor whose rotor or stator is formed of a flat or disk shaped coil.

A known method of manufacturing particularly a cylindrical motor coil includes the so-called skew winding method (also referred to as "a honeycomb method") described in U.S. Pat. No. 3,191,081 and the bell method. These methods consist in winding a wire around a columnar bobbin to provide a coil of a prescribed shape. Therefore, the conventional methods have the drawbacks that difficulties arise in mechanically winding a wire at high speed resulting in a decline in the coil manufacturing efficiency. Further disadvantages of the conventional coil manufacturing methods are that a bobbin wound with a wire unavoidably has a great thickness in order to withstand a mechanical force applied by the wound wire, and consequently becomes heavy; some turns of a coil are superposed on each other, thus increasing the thickness of the coil and a bobbin; and some portions of the coil become electromagnetically inactive, failing to elevate the efficiency of a motor comprising such defective coil. These undesirable events take place not only in a cylindrical motor coil, but also in any other type of motor coil.

It is accordingly, an object of this invention to provide coil elements which can be assembled into a motor coil and which are capable of elevating the performance of an electric motor.

Another object of the invention is to provide a method of manufacturing a motor coil efficiently and at low cost by assembling coil elements.

SUMMARY OF THE INVENTION

To this end, the present invention provides a coil element which is manufactured by the steps of:

forming an original winding by winding a wire helically and concentrically; setting an even number 2n (n=1, 2, ...) of division points on the periphery of the original winding which equally divide the periphery of the winding; defining reference lines which pass through the division points respectively; defining bending lines which pass through said division points respectively, have a prescribed bending angle to said reference lines and divide the original winding into an even number of equal segments; bending the original winding in such a manner that the alternate bending lines project in the same direction; and finally causing the front and back sides of the segments of the original winding to alternately appear on a surface of a finished coil.

According this invention, the original winding has three types. A first type is constructed by winding a wire helically and concentrically around a columnar surface in a cylindrical form. A second type is constructed by helically and concentrically winding a wire on the same plane in a ring form. A third type is formed by winding a wire helically and concentrically in a truncated conical form.

Coil elements provided by this invention include three types. A first type is constructed by arranging the respective segments of an original winding along a columnar plane in a cylindrical form. A second type is constructed by arranging the respective segments of an original winding or the same plane in the form of a star, thereby providing a flat star-shaped coil element. A third type is formed by arranging the respective segments of an original winding along a truncated conical plane, thereby providing a truncated conical coil element. These three types of coil elements can be fabricated from any of the aforesaid three types of original windings.

BRIEF DESCRIPTION OF THE DRAWINGS

FIG. 1 is an oblique view of a cylindrical winding.

FIG. 2 is a plan view of a flat ring-shaped original winding.

FIG. 3 is an oblique view of a truncated conical original winding;

FIG. 4 is an oblique view of a coil element fabricated from the original winding of FIG. 1.

FIG. 5 is an oblique view of a coil element fabricated from the original winding of FIG. 2 or 3. The coil elements of FIGS. 4 and 5 have such a shape capable of being fitted around an imaginary columnar plane.

FIG. 6 is a schematic plan view of a coil element formed of the original winding of FIG. 1.

FIG. 7 is a schematic plan view of a coil element prepared from the original winding of FIG. 3. The coil elements of FIGS. 6 and 7 have such a shape as is capable of being set in a region defined between the imaginary concentric circles.

FIG. 8 is a schematic oblique view of a coil element fabricated from the original winding of FIG. 1.

FIG. 9 is a schematic oblique view of a coil element obtained from the original winding of FIG. 2 or 3. The coil elements of FIGS. 8 and 9 have such a shape as is capable of being fitted around a truncated conical plane;

FIGS. 14 and 16 are plan views of flat ring-shaped original windings. FIGS. 15 and 17 are deployment views of coil elements fabricated from the original windings of FIGS. 14 and 16.

DETAILED DESCRIPTION

Figure 1:
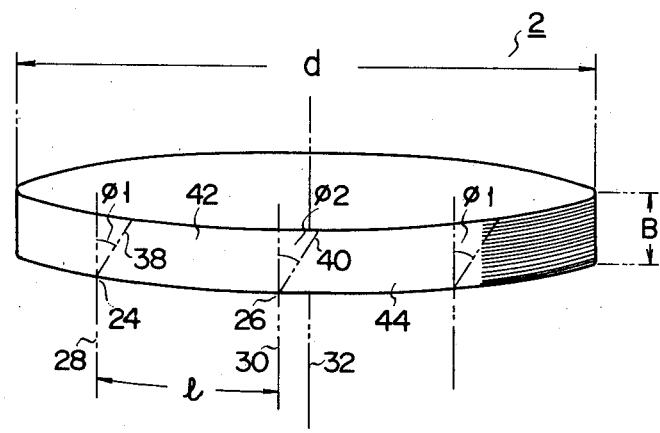
FIGS. 1 to 3 indicate three types of original windings from which an electric motor coil element is fabricated.
Figure 2:
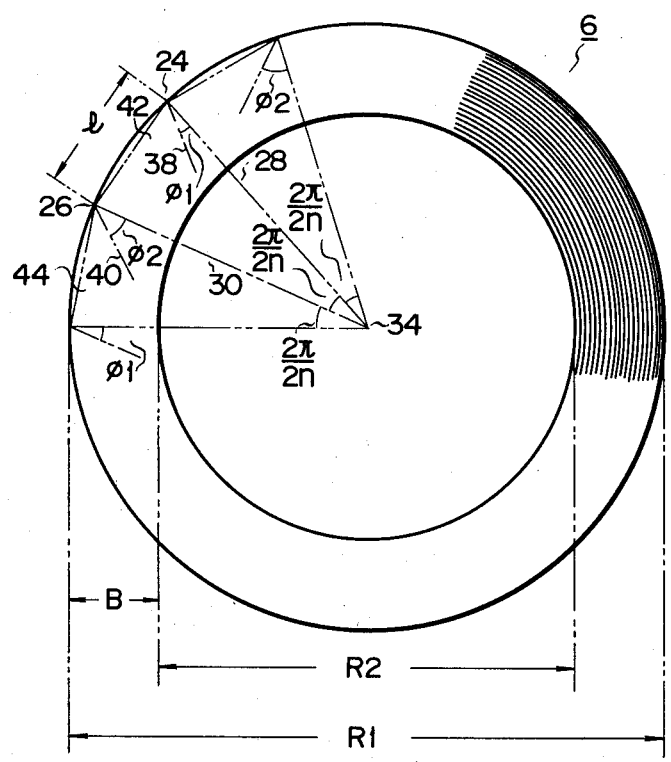
Figure 3:
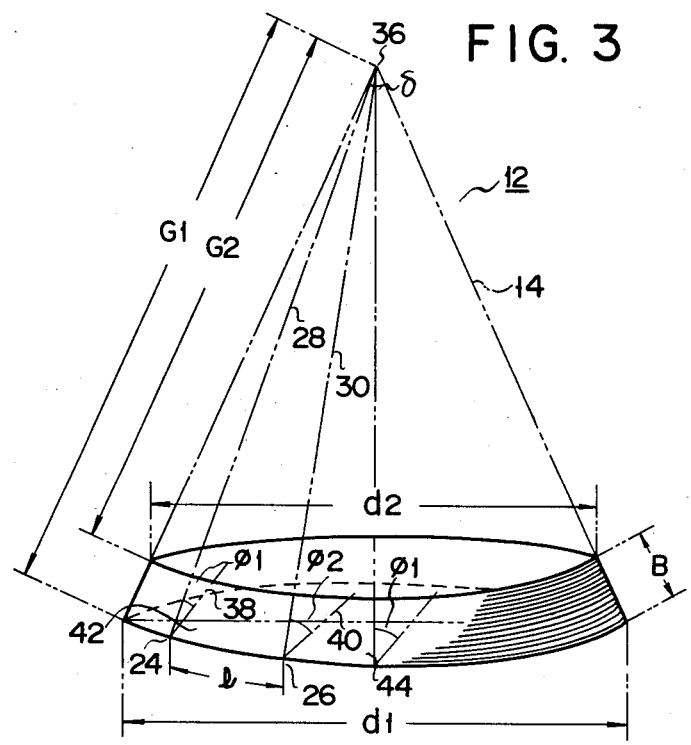

As previously described, there are three types of original windings from which an electric motor coil element embodying this invention can be fabricated. As seen from FIG. 1, a first original winding 2 is constructed by closely winding a conductive wire around the periphery of an imaginary columnar block in a cylindrical form. A second original winding 6 is formed by winding a conductive wire concentrically on the same plane in the form of a flat ring (FIG. 2). A third original winding 12 is fabricated by winding a conductive wire closely the periphery of an imaginary truncated conical block form 14 (FIG. 3). An electrically conductive wire from which the above-mentioned original windings 2, 6, 12 are produced is coated with a flux and electrically insulating layer. Bobbins (not shown) used in the fabrication of the original windings have shapes matching those into which said original windings are formed. Thus, the bobbin of the first original winding 2 has a columnar shape. The bobbin of the second original winding 6 has a flat shape. The central region of said bobbin is provided with a circular projection. The bobbin of the third winding has a truncated conical shape. Where a wire is wound about any of these bobbins in the prescribed form, then the flux coated on the surface of the wound wire is melted by application of an organic solvent or heat. Where the melted flux is solidified, then an integral body consisting of the wound wire is formed and the wound wire is taken off from the bobbin to provide a winding securely formed into a prescribed shape. At this time, the original windings 2, 6, 12 are all in the form of an endless band. The original winding which is constructed by winding a single wire about a bobbin has a wind-starting end and a wind-terminating end.

Figure 4:
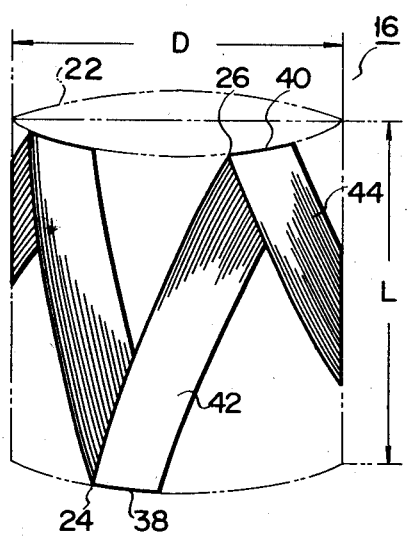
FIGS. 4 to 9 illustrate various types of electric motor coil elements.
Figure 6:
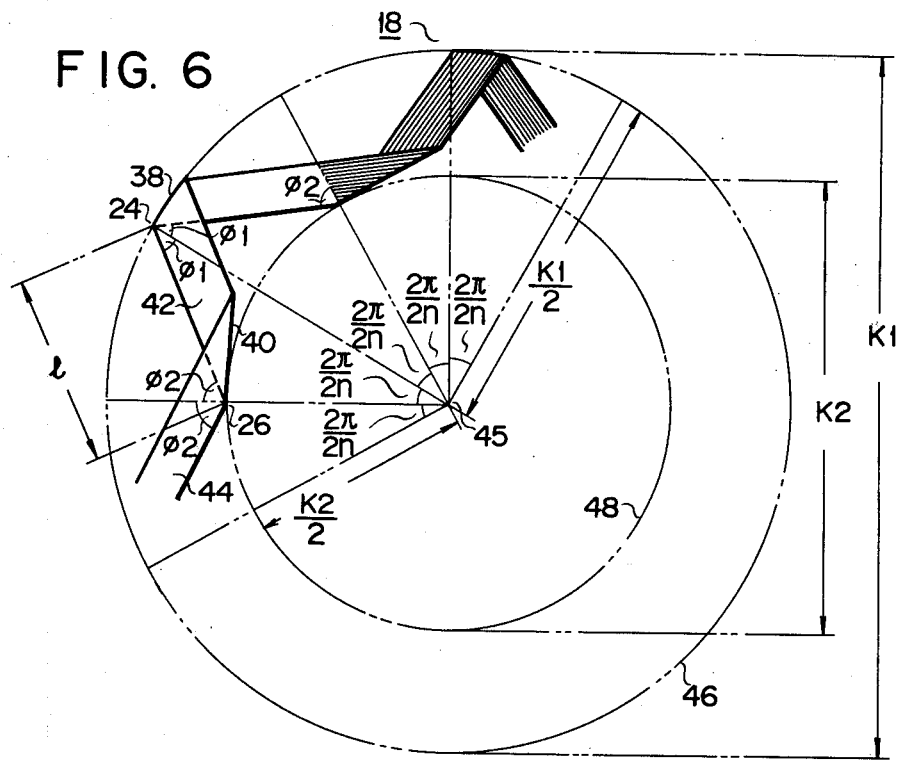
Figure 8:
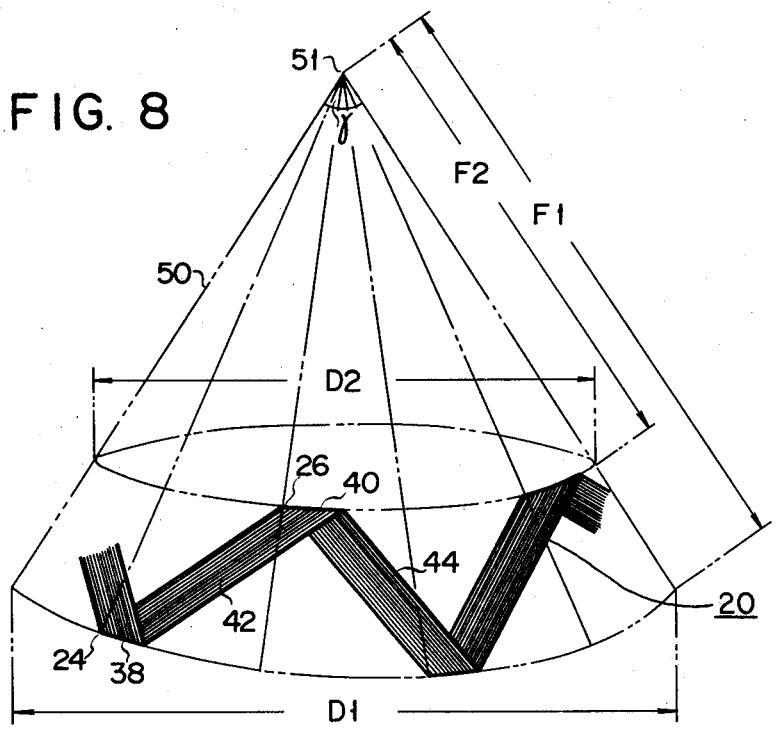

Coil elements 16, 18, 20 respectively shaped as shown in FIG. 4 (or 5), FIG. 6 (or 7) and FIG. 8 (or 9) can be respectively fabricated from the aforesaid three types 2, 6, 12 of original windings.

Figure 5:
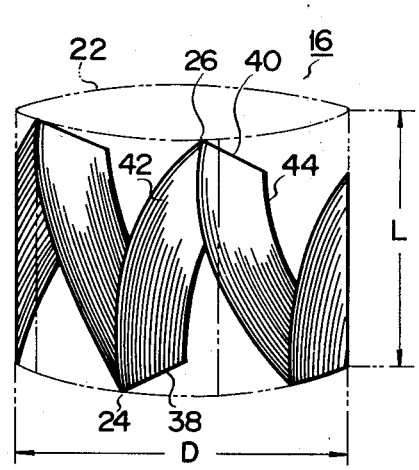

Description is now given of the method of manufacturing a first coil element 16 shown in FIG. 4 or 5 by bending an original winding and letting the bent segments thereof extend along the periphery of an imaginary columnar block form 22.

First, a plurality of, that is, a number of 2n (n is an integer of 1, 2 or 3) of equal division points 24, 26 are set on the periphery of any of the original windings 2, 6, 12 (the reference numerals 24, 26 denote every two adjacent equal division points). With the first original winding 2 having a cylindrical shape, the equal division points 24, 26 are set, as shown in FIG. 1, on the lower periphery of the cylindrical original winding 2. With respect to the second ring-shaped original winding 6, the equal division points 24, 26 are set, as shown in FIG. 2, on the periphery of the outer diameter of the ring shape. With respect to the third orignal winding 12 having a truncated conical shape, the equal divisiion points 24, 26 are provided, as indicated in FIG. 3, on the periphery of the base of the truncated cone.

Thereafter, imaginary reference lines 28, 30 are prescribed which pass through the above-mentioned equal division points 24, 26. With respect to the first cylindrical original winding 2, the imaginary reference lines 28, 30 are disposed in parallel with the axis of the cylinder. With respect to the second ring-shaped original winding 6, the imaginary reference lines 28, 30 are chosen to pass through the center 34 of said ring-shaped original winding 6. With respect to the third original winding 12 having a truncated conical shape, the imaginary reference lines 28, 30 are chosen to convergently pass through the imaginary apical point 36 of said truncated conical block form.

Further, bending lines 38, 40 are provided which pass through the equal division points 24, 26 at prescribed angles $\phi_1$, $\phi_2$ to the respective imaginary reference lines 28, 30. As illustrated in FIGS. 1 to 3, every alternate bending line 38 defines the same angle $\phi_1$ with the corresponding imaginary reference line 28. Every alternate bending line 40 defines the same angle $\phi_2$ with the corresponding imaginary reference line 30. Where the first coil element 16 shown in FIG. 4 is fabricated, then the bending angles $\phi_1$, $\phi_2$ are defined to have to following relationship:

$$\phi_1 = \phi_2 = \phi$$

Therefore, the bending lines 38, 40 divide the original windings 2, 6, 12 shown in FIGS. 1 to 3 into a 2n number of substantially equal band shaped segments 42, 44.

In practice, preliminary bending is applied to the original winding along the bending lines 38, 40 by means of a jig. With respect to the first original winding 2 of FIG. 1 and the third original winding 12 of FIG. 3, pressure is applied to said original windings 2, 12 in such a manner that the bending line 38 projects outward, and the bending line 40 adjacent to said bending line 38 projects inward. The outward and inward projections are alternately repeated. With respect to the second disk-shaped original winding 6, pressure is applied to said original winding 6 in such a manner that the bending line 38 projects upward and the bending line 40 adjacent to said bending line 38 projects downward. The upward and downward projections are alternately repeated. The original windings 2, 6, 12 which have been subjected to the above-mentioned preliminary bending are each fitted with a columnar jig having a diameter of substantially D and are again pressed to be bent. As a result, a coil element 16 is provided which, as shown in FIG. 4 or 5, has a diameter D and a height L, and whose band shaped segments 42, 44 extend along the periphery of an imaginary columnar block form 22.

Figure 10:
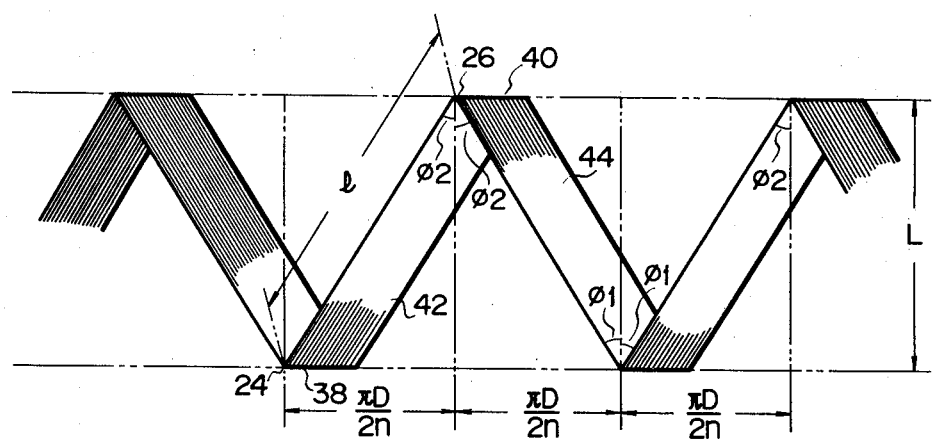
FIG. 10 is a deployment view of the coil element of FIG. 4.
Figure 11:
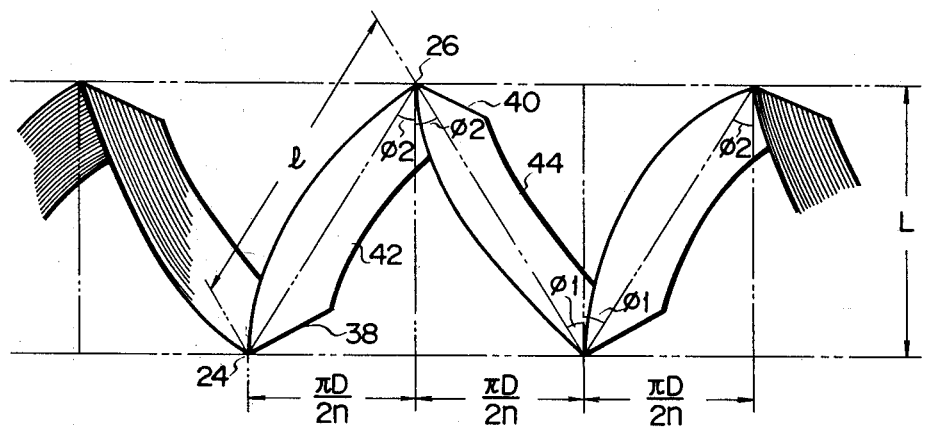
FIG. 11 is a deployment view of the coil element of FIG. 5.

As is apparent from the above-mentioned manufacturing steps, that plane of the band-shaped segment 42 which is exposed on the surface of the coil element 16 shown in FIG. 4 or 5 corresponds to the outer surface of the original windings 2, 12. That plane of the band-shaped segment 44 which is exposed on the surface of the coil element 16 corresponds to the inner surface of the original windings 2, 12. In other words, the outer and inner surfaces of the original windings 2, 12 alternately appear on the outer surface of the coil element 16 as shown in FIG. 4 or 5 as a result of bending. With respect to the coil element 16 of FIG. 5 which is fabricated from the original winding 6 shown in FIG. 2, the upper and lower surfaces of the original winding 6 are alternately exposed on the outer surface of said coil element 16. On the upper and lower portions of the coil element 16, the band-shaped segments 42, 44 are superposed on each other by bending. The equal division points 24 are indicated on the lower periphery of the imaginary columnar block form 22 substantially at an equal distance. The equal division points 26 are substantially equidistantly set on the upper periphery of said imaginary columnar block form 22. With the coil element 16 shown in FIG. 4, the segments 42, 44 assume a straight band shape. Said segments 42, 44 are fabricated from the first original winding 2 of FIG. 1. For reference, a coil element 16 fabricated from the original winding 2 of FIG. 2 is shown in FIG. 10. As seen from FIG. 5, coil elements 16 fabricated from the original windings 6, 12 of FIGS. 2 and 3 have arcuate segments 42, 44, as shown in FIG. 11.

For fabrication of the coil element 16 of FIG. 4, the original windings 2, 6, 12 must meet the undermentioned requirements. Discription is given of each type of original winding. In this case, the bending angles $\phi_1$, $\phi_2$ shown in the drawing are all equal, that is, to have the following relationships $$\phi = \phi_1 = \phi_2 \quad (1)$$

Where the coil element 16 of FIG. 4 having a diameter D and a height L is fabricated from the first cylindrical original winding 2 of FIG. 1, then said first cylindrical original winding 2 should have a diameter d defined by the following equation (2) or (3), and an optionally selectable width B and be bent at an angle $\phi$ determined by the following equation (4).

$$d = \frac{D}{\sin \phi} \quad (2)$$

$$d = \frac{2n L}{\pi \cos \phi} \quad (3)$$

$$\phi = \tan^{-1}\left( \frac{\pi}{2n} \cdot \frac{D}{L} \right) \quad (4)$$

Where the first coil element 16 shown in FIG. 5 is formed of the second flat ring-shaped original winding 6 shown in FIG. 2, then said second original winding 6 should have an outer diameter $R_1$ defined by the following equation (5) or (6), and optionally selectable inner diameter $R_2$ and width B, and be bent at an angle $\phi$ defined by the aforesaid equation (4).

$$R_1 = \frac{\pi D}{2n \sin\left(\frac{\pi}{2n}\right) \cdot \sin \phi} \quad (5)$$

$$R_1 = \frac{L}{\sin\left(\frac{\pi}{2n}\right) \cdot \cos \phi} \quad (6)$$

The inner diameter $R_2$ of the flat ring-shaped original winding 6 is expressed as $$R_2 = R_1 - 2B \quad (7)$$

Where the fist coil element 16 shown in FIG. 5 is prepared from the third truncated conical original winding 12 of FIG. 3, then said third truncated conical original winding 12 should have a larger diameter d1 defined by the following equation (8) or (9), and optionally selectable apical angle $\delta$, smaller diameter d2 and width B and be bent at an angle defined by the aforesaid equation (4).

$$d_1 = \frac{\pi D \sin\left(\frac{\delta}{2}\right)}{2n \sin\left\{\left(\frac{\pi}{2n}\right) \sin\left(\frac{\delta}{2}\right)\right\} \cos \phi} \quad (8)$$

$$d_1 = \frac{L \sin\left(\frac{\delta}{2}\right)}{\sin\left\{\left(\frac{\pi}{2n}\right) \sin\left(\frac{\delta}{2}\right)\right\} \cos \phi} \quad (9)$$

The smaller diameter d2 of the truncated conical original winding 12 is expressed as $$d_2 = d_1 - 2B \sin(\delta/2) \quad (10)$$

Figure 7:
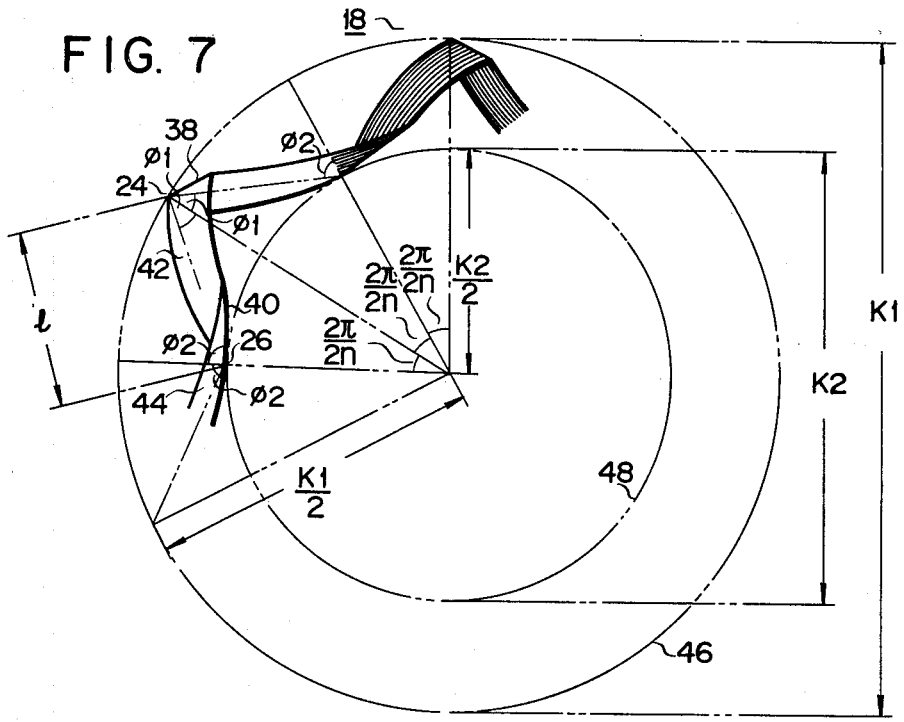

Description is now given of the method of fabricating the second star-shaped coil element 18 shown in FIG. 6 or 7. First, an even number or a number of 2n (n denotes an integer of 1, 2 or 3 ... ) of equal division points 24, 26 are set on the periphery of any of the original windings 2, 6, 12. With the first cylindrical original winding 2, the equal division points 24, 26 are indicated on the periphery of the lower end portion of said cylindrical original winding 2. With the second flat ring-shaped original winding 6, the equal division points 24, 26 are defined on the periphery of the outer diameter of said ring-shaped original winding 6 as shown in FIG. 2. With the third truncated conical original winding 12, the equal division points 24, 26 are set on the periphery of the base of said truncated conical original winding 12 as shown in FIG. 3.

Thereafter, imaginary reference lines 28, 30 passing through the equal division points 24, 26 are specified. With the first cylindrical original winding 2, the imaginary reference lines 28, 30 are positioned in parallel with the axis 32 of said cylindrical original winding 2. With the second flat ring-shaped original winding 6, the imaginary reference lines are chosen to pass through the center 34 of said ring-shaped original winding 6. With the third truncated conical original winding 12, the imaginary reference lines are chosen to convergently pass through the apical point 36 of an imaginary conical block form.

Thereafter, bending lines 38, 40 are prescribed which pass through the equal division points 24, 26 at angles $\phi_1$, $\phi_2$ to the respective imaginary reference lines 28, 30. As seen from FIGS. 1 to 3, the adjacent bending lines 38, 40 are inclined in the circumferential direction at angles $\phi_1$, $\phi_2$ respectively. Thus, the bending lines 38, 40 divide the original windings 2, 6, 12 shown in FIGS. 1 to 3 into a 2n number of equal band-shaped segments 42, 44.

Preliminary bending is applied to the original windings 2, 6, 12 along the bending lines 38, 40 by means of a jig. With the first and third original windings 2, 12 shown in FIGS. 1 and 3, pressure is applied in such a manner that the bending line 38 projects outward and the bending line 40 adjacent to said bending line 38 projects inward; that is, the outward and inward projections are alternately repeated. With the second flat ring-shaped conical winding 6, pressure is applied in such a manner that the bending line 38 projects upward and the bending line 40 adjacent to said bending line 38 project downward; that is, the upward and downward projections are alternately repeated. The original winding 2, 6, 12 which have been subjected to preliminary bending are fitted with a flat jig and are again pressed to be bent. As a result, a coil element 18 is provided which has an inner diameter of K2 and an outer diameter of K1 and a center 45 and wherein band-shaped segments 42, 44 extend along the outer periphery of the inner concentric circle 46 and the inner periphery of the outer concentric circle 48.

As is apparent from the above-mentioned manufacturing steps, that plane of the band-shaped segment 42 which is exposed on the uter surface of the coil element 18 shown in FIGS. 6 and 7 corresponds to the outer surface of the original windings 2, 12. That plane of the band-shaped segment 44 which is exposed on the outer surface of said coil element 18 corresponds to the inner surfaces of the original windings 2, 12. The outer and inner surfaces of the original windings 2, 12 alternately appear on the outer surface of the coil element 18 as shown in FIG. 6 or 7. With the coil element 18 of FIG. 7 fabricated from the original winding 6 of FIG. 2, the upper and lower surfaces of said original winding 6 are exposed alternately. On the upper and lower portions of the coil element 16, the band-shaped segments 42, 44 are superposed on each other. The equal division points 24 are set on the periphery of an imaginary circle 46 substantially at an equal distance. The equal division points 26 are set on the periphery of an imaginary circle 48 substantially at an equal distance. The segments 42, 44 of the coil element 18 of FIG. 6 fabricated from the first original winding 2 have a linear band shape. The coil elements 18 fabricated from the original windings 6, 12 shown in FIGS. 2 and 3 respectively have arcuate segments 42, 44.

For fabrication of the coil element 18 shown in FIGS. 6 and 7, the original windings 2, 6, 12 should meet the undermentioned requirements. Description is given of the respective types 2, 6, 12 of original winding. Where the second flat star-shaped coil element 18 of FIG. 6 whose reference outer circle has a diameter K1 and whose reference inner circle has a diameter K2 is fabricated from the first cylindrical original winding 2 of FIG. 1, then, this first original winding 2 should have a diameter d defined by the following equation (11) or (12), and optionally selectable width B and be bent at angles $\phi_1$, $\phi_2$ defined by the following equations (13), (14).

$$d = \frac{n K1 \sin\left(\frac{\pi}{n}\right)}{\pi \sin \phi_2} \quad (11)$$

$$d = \frac{n K2 \sin\left(\frac{\pi}{n}\right)}{\pi \sin \phi_1} \quad (12)$$

$$\phi_1 = \tan^{-1}\left\{\frac{\sin\left(\frac{\pi}{n}\right)}{\frac{K1}{K2} - \cos\left(\frac{\pi}{n}\right)}\right\} \quad (13)$$

$$\phi_2 = \phi_1 + \frac{\pi}{n} \quad (14)$$

Where the second flat star-shaped coil element 18 of FIG. 6 is prepared from the second flat ring-shaped original winding 6 shown in FIG. 2, then this original winding 6 should have an outer diameter $R_1$ defined by the following equation (15) or (16), and be bent at angles $\phi_1$, $\phi_2$ defined by the above-mentioned equations (13), (14).

$$R_1 = \frac{K1 \cos\left(\frac{\pi}{2n}\right)}{\sin \phi_2} \quad (15)$$

$$R_1 = \frac{K2 \cos\left(\frac{\pi}{2n}\right)}{\sin \phi_1} \quad (16)$$

The inner diameter $R_2$ and width B of the second original winding 6 of FIG. 2 can be optionally selected.

Where the second flat star-shaped coil element 18 of FIG. 6 is fabricated from the third truncated conical original winding 12 of FIG. 3, then this third original winding 12 should have a larger diameter $d_1$ defined by the following equation (17) or (18), and be bent at angles $\phi_1$, $\phi_2$ defined by the aforesaid equations (13), (14).

$$d_1 = \frac{K1 \sin\left(\frac{\pi}{n}\right) \sin\left(\frac{\delta}{2}\right)}{2\sin \phi_2 \cdot \sin\left\{\left(\frac{\pi}{2n}\right) \sin\left(\frac{\delta}{2}\right)\right\}} \quad (17)$$

$$d_1 = \frac{K2 \sin\left(\frac{\pi}{n}\right) \sin\left(\frac{\delta}{2}\right)}{2\sin \phi_1 \sin\left\{\left(\frac{\pi}{2n}\right) \sin\left(\frac{\delta}{2}\right)\right\}} \quad (18)$$

The apical angle $\delta$, smaller diameter $d_2$ and width B of the third truncated conical original winding 12 of FIG. 3 can be optionally chosen.

Figure 9:
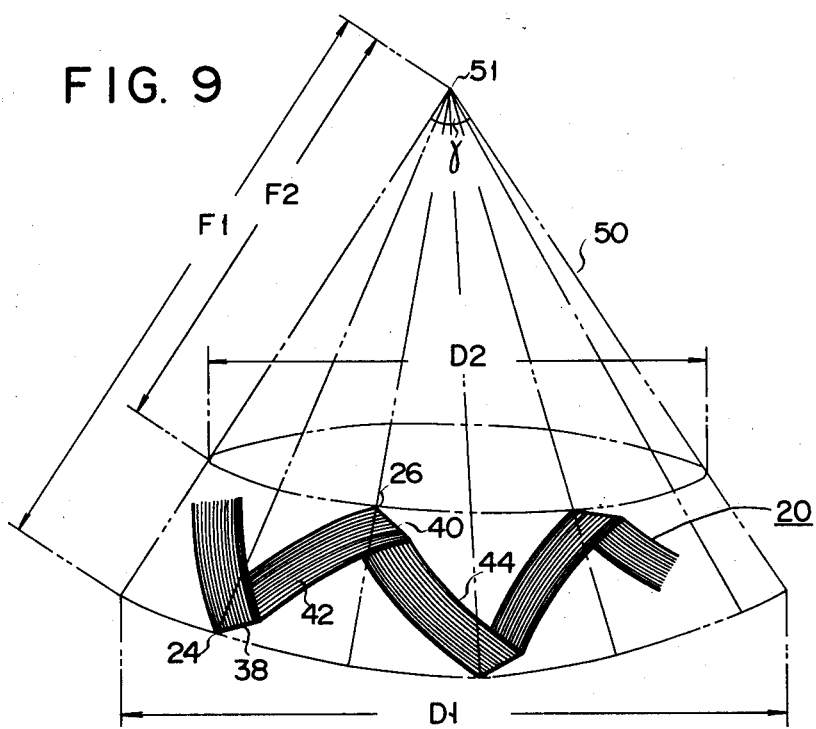

Description is now given of the method of manufacturing a third coil element 20 by fitting any of the three types 2, 6, 12 of original windings around the periphery of an imaginary truncated conical block form shown in FIG. 8 or 9.

First, an even number, that is, a 2n number (n denotes an integer of 1, 2 and 3 . . . ) of equal division points 24, 26 are set on the periphery of any of the original windings 2, 6, 12 substantially at an equal distance. With the first cylindrical winding 2, the equal division points 24, 26 are set on the lower end periphery shown in FIG. 1. With the second flat ring-shaped original winding 6 shown in FIG. 2, the equal division points 24, 26 are provided on the periphery of the outer diameter of the ring shape. With the third truncated conical original winding 12, the equal division points 24, 26 are set on the base periphery of the winding 12 as shown in FIG. 3.

Thereafter, imaginary reference lines 28, 30 are specified which pass through the equal division points 24, 26. With the first cylindrical original winding 2, the imaginary reference lines 28, 30 are disposed in parallel with the axis of an imaginary cylindrical block form. With the second flat ring-shaped original winding 6, the imaginary reference lines 28, 30 are chosen to convergently pass through the center 34 of said ring-shaped original winding 6. With the third truncated conical original winding 12, the reference lines 28, 30 are arranged to convergently pass through the apical point 36 of an imaginary truncated conical block form.

Further, bending lines 38, 40 are specified which pass through the equal division points 24, 26 at prescribed angles $\phi_1$, $\phi_2$ to the imaginary reference lines 28, 30. As seen from FIGS. 1 to 3, the adjacent bending lines 38, 40 are inclined respectively at angles $\phi_1$, $\phi_2$ in the circumferential direction. Therefore, the bending lines 38, 40 divide the original winding 2, 6, 12 shown in FIGS. 1 to 3 into a 2n number of band shaped segments 42, 44.

Preliminary bending is applied to the respective original windings 2, 6, 12 by means of a jig. With the first and third original windings 2, 12 of FIGS. 1 and 3, pressure is applied in such a manner that the bending line 38 projects outward, and the bending line 40 adjacent to said bending lines 38 projects inward. Outward and inward projections are alternately repeated. With the second flat ring-shaped original winding 6, pressure is applied in such a manner that the bending line 38 projects upward, and the bending line 40 adjacent to said bending line 38 projects downward. Upward and downward projections are alternately repeated. The original windings 2, 6, 12 which have been subjected to the above-mentioned preliminary bending are each fitted with a truncated cone jig and gain pressed to be bent. As a result, a coil element 20 is formed whose segments 42, 44 extend along the periphery of an imaginary truncated conical block form 50 shown in FIGS. 8 and 9 which has a larger diameter D1, smaller diameter D2 and an angle $\gamma$ at an imaginary apical point 51.

As is apparent from the above-mentioned manufacturing steps, that plane of the segment 42 which is exposed on the outer surface of the coil element 20 shown in FIGS. 8 and 9 corresponds to the outer surface of the original windings 2, 12. That plane of the segment 44 which is exposed on the outer surface of the coil element 20 corresponds to the inner surface of the original windings 2, 12. The outer and inner surfaces of the respective original windings 2, 12 alternately appear on the outer surface of the coil element 20 as a result of bending. With the coil element 20 of FIG. 9 fabricated from the flat ring-shaped original winding 6 of FIG. 2, the upper and lower surfaces of said flat ring-shaped original winding 6 alternately appear on the outer surface of said coil element 20. On the upper and lower portions of the coil element 20, the segments 42, 44 of said original winding 6 are superposed on each other as a result of bending. The equal division points 26 are defined substantially at an equal distance on the periphery of the upper smaller diameter of an imaginary truncated conical block form 50. The equal division points 24 are set substantially at an equal distance on the periphery of the lower larger diameter of said imaginary truncated conical block form 50. The segments 42, 44 of the coil element 20 of FIG. 8 fabricated from the first cylindrical original winding 2 of FIG. 1 have a straight band shape. The segments 42, 44 of the coil element 20 of FIG. 9 prepared from the flat ring-shaped original winding 6 of FIG. 2 and the truncated conical original winding 12 of FIG. 3 have an arcuate band shape. Thus, the coil element 20 is constructed as illustrated in FIG. 9.

For fabrication of the coil element 20 shown in FIGS. 8 and 9, the original windings 2, 6, 12 should meet the undermentioned requirements. Description is given of the respective types 2, 6, 12 of original winding. Where the third truncated conical coil element 20 is fabricated from the first cylindrical original winding 2 of FIG. 1 by causing the bent segments of said original winding 2 to extend along the periphery of an imaginary truncated conical block form having an apical angle $\gamma$, larger diameter D1 and smaller diameter D2, then this cylindrical original winding 2 should have a diameter d defined by the following equation (19) or (20) and be bent at angles $\phi_1$, $\phi_2$ respectively defined by the following equations (21), (22).

$$d = \frac{n}{\pi} \cdot \frac{D1 \sin\left\{\left(\frac{\pi}{n}\right) \sin\left(\frac{\gamma}{2}\right)\right\}}{\sin\left(\frac{\gamma}{2}\right) \sin \phi_2} \quad (19)$$

$$d = \frac{n}{\pi} \cdot \frac{D2 \sin\left\{\left(\frac{\pi}{n}\right) \sin\left(\frac{\gamma}{2}\right)\right\}}{\sin\left(\frac{\gamma}{2}\right) \sin \phi_1} \quad (20)$$

$$\phi_1 = \tan^{-1}\left[\frac{\sin\left\{\left(\frac{\pi}{n}\right) \sin\left(\frac{\gamma}{2}\right)\right\}}{\frac{D1}{D2} - \cos\left\{\left(\frac{\pi}{n}\right) \sin\left(\frac{\gamma}{2}\right)\right\}}\right] \quad (21)$$

$$\phi_2 = \phi_1 + \frac{\pi}{n} \sin\left(\frac{\gamma}{2}\right) \quad (22)$$

Where the third coil element of FIG. 9 is fabricated from the second flat ring-shaped original winding 6 of FIG. 2, then said second original winding 6 should have an outer diameter $R_1$ defined by the following equation (23) or (24) and be bent at angles $\phi_1$, $\phi_2$ defined by the aforesaid equations (21) and (22).

$$R_1 = \frac{D1}{2 \sin \phi_2} \cdot \frac{1}{\sin\left(\frac{\gamma}{2}\right)} \cdot \frac{\sin\left\{\left(\frac{\pi}{n}\right) \sin\left(\frac{\gamma}{2}\right)\right\}}{\sin\left(\frac{\pi}{2n}\right)} \quad (23)$$

$$R_1 = \frac{D2}{2 \sin \phi_1} \cdot \frac{1}{\sin\left(\frac{\gamma}{2}\right)} \cdot \frac{\sin\left\{\left(\frac{\pi}{n}\right) \sin\left(\frac{\gamma}{2}\right)\right\}}{\sin\left(\frac{\pi}{2n}\right)} \quad (24)$$

Where the coil element 20 of FIG. 9 is formed of the third truncated conical original winding 12 of FIG. 3, then said third original winding 12 should have a larger diameter $d_1$ defined by the following equation (25) or (26) and be bent at angles $\phi_1$, $\phi_2$ respectively defined by the aforementioned equation (21) and (22).

$$d_1 = \frac{D1}{2 \sin \phi_2} \cdot \frac{\sin\left(\frac{\delta}{2}\right)}{\sin\left(\frac{\gamma}{2}\right)} \cdot \frac{\sin\left\{\left(\frac{\pi}{n}\right) \sin\left(\frac{\gamma}{2}\right)\right\}}{\sin\left\{\left(\frac{\pi}{2n}\right) \sin\left(\frac{\delta}{2}\right)\right\}} \quad (25)$$

-continued $$d_1 = \frac{D2}{2\sin\phi_1} \cdot \frac{\sin\left(\frac{\delta}{2}\right)}{\sin\left(\frac{\gamma}{2}\right)} \cdot \frac{\sin\left\{\left(\frac{\pi}{n}\right)\sin\left(\frac{\gamma}{2}\right)\right\}}{\sin\left\{\left(\frac{\pi}{2n}\right)\sin\left(\frac{\delta}{2}\right)\right\}} \quad (26)$$

Figure 12:
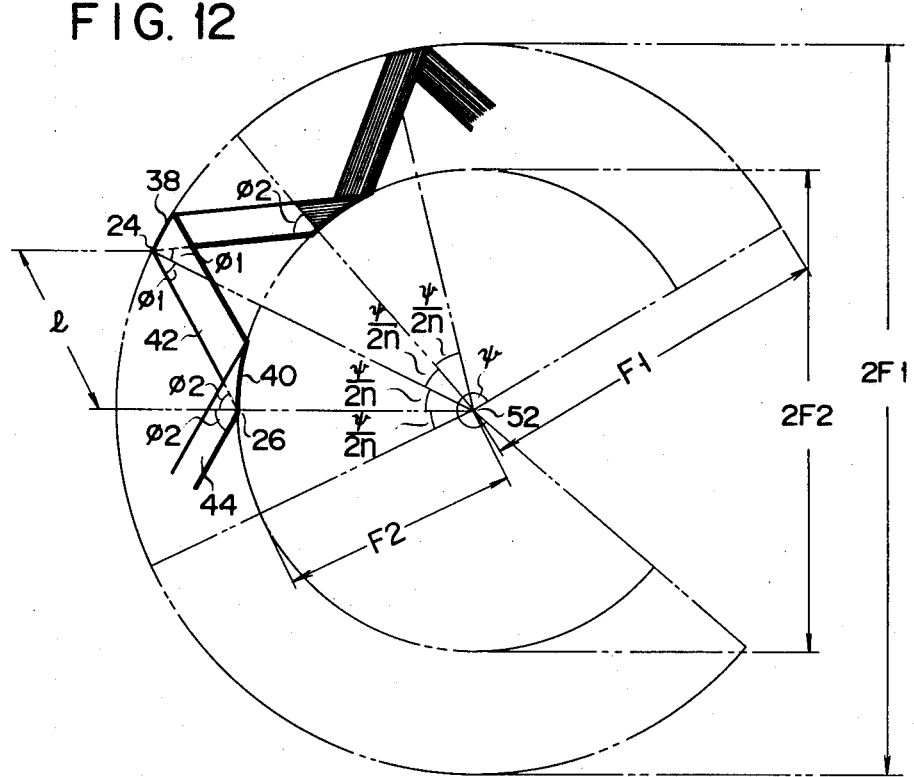
FIG. 12 is a deployment view of the coil element of FIG. 8.

The equations (21), (22), (25) and (26) are the fundamental forms of other equations. Therefore, these equations (21), (22), (25) and (26) are first proved.

Where the third coil element 20 is deployed as shown in FIGS. 8 and 9 in which the bent segments of the original winding extend along the periphery of an imaginary truncated conical block form, then the third coil element is positioned, as shown in FIG. 12, in a region defined between two concentric circles respectively having diameters 2F1, 2F2. The central angle $\Psi$ which the deployed coil element 20 defines with the center 52 of deployment is expressed by the following equation.

$$\Psi = 2\pi \sin(\gamma/2) \quad (27)$$

The equal division points 24, 26 divide the periphery of a circle having a larger diameter D1 (FIGS. 8 and 9) into equal parts. Straight distances l between every adjacent equal division points 24, 26 are the same. As seen from FIG. 12, therefore, lines connecting the equal division points 24, 26 to the deployment center 52 divide the central development angle $\Psi$ into a 2n number of equal segments. Therefore, an angle defined by the equal division points 24, 26 is $\Psi/2n$. Thus, all the triangles defined by all the adjacent equal division points 24, 26 and the deployment center 52 have the same shape. As seen from FIG. 12, a triangle has interior angles $\Psi/2n$ and $\phi_1$ and an exterior angle $\phi_2$. The respective sides of said triangle have lengths l, F2, F1. Where, therefore, the sine theorem is applied, the following equation (28) results.

$$\frac{F1}{\sin\phi_2} = \frac{F2}{\sin\phi_1} = \frac{l}{\sin\left(\frac{\Psi}{2n}\right)} \quad (28)$$

This equation (28) may be modified into the following equations (29) and (30).

$$l = F1 \times \frac{\sin\left(\frac{\Psi}{2n}\right)}{\sin\phi_2} \quad (29)$$

$$l = F2 \times \frac{\sin\left(\frac{\Psi}{2n}\right)}{\sin\phi_1} \quad (30)$$

Figure 13:
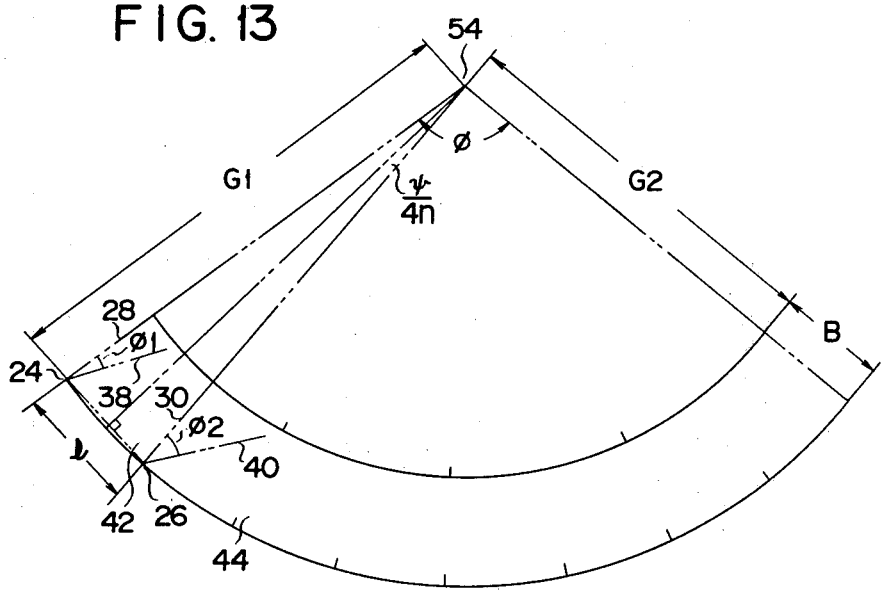
FIG. 13 is a deployment view of the original winding of FIG. 3.

When deployed, the third truncated conical original winding 12 indicates an arcuate band shape, which has a deployment center 54 and deployment center angle $\phi$. Since, in FIG. 13, straight lines l between the respective adjacent equal division points 24, 26 are the same, an angle defined by said straight line l with the deployment center 54 is $\Psi/2$. Therefore, the straight distance l between the adjacent equal division points 24, 26 and deployment center angle $\phi$ are respectively expressed by the following equations (31) and (32)

$$l = 2G1 \sin(\phi/4n) \quad (31)$$

$$\phi = 2\pi \sin(\delta/2) \quad (32)$$

The following equation (33) is derived from the figure of FIG. 3.

$$d1 = 2G1 \sin(\delta/2) \quad (33)$$

The following equations (34) and (35) result from the figure of FIG. 8.

$$D1 = 2F1 \sin(\gamma/2) \quad (34)$$

$$D2 = 2F2 \sin(\gamma/2) \quad (35)$$

Substituting the equation (31) for the equation (33), the following equation results.

$$d1 = \frac{l \sin\left(\frac{\delta}{2}\right)}{\sin\left(\frac{\phi}{4n}\right)} \quad (36)$$

Substituting the equation (29) for the equation (36), the following equation is derived.

$$d1 = \frac{F1 \cdot \sin\left(\frac{\delta}{2}\right) \cdot \sin\left(\frac{\Psi}{2n}\right)}{\sin\phi_2 \cdot \sin\left(\frac{\phi}{4n}\right)} \quad (37)$$

Further substituting the equation (34) for the equation (37), the following equation is produced.

$$d1 = \frac{\sin\left(\frac{\delta}{2}\right)}{2\sin\left(\frac{\gamma}{2}\right)} \cdot \frac{\sin\left(\frac{\Psi}{2n}\right)}{\sin\left(\frac{\phi}{4n}\right)} \cdot \frac{D1}{\sin\phi_2} \quad (38)$$

Substituting the equations (30) and (35) for the equation (36), the following equation is obtained.

$$d1 = \frac{\sin\left(\frac{\delta}{2}\right)}{2\sin\left(\frac{\gamma}{2}\right)} \cdot \frac{\sin\left(\frac{\Psi}{2n}\right)}{\sin\left(\frac{\phi}{4n}\right)} \cdot \frac{D2}{\sin\phi_1} \quad (39)$$

Substituting the equations (27) and (32) for the equation (38) and substituting the equations (27) and (32) for the equation (39), the aforesaid equations (25) and (26) are formed.

The ratio of F1 to F2 is expressed as follows from the equation (28) and equations (34) and (35).

$$F1/F2 = \sin\phi_2/\sin\phi_1 = D1/D2 \quad (40)$$

where the above equation (40) is substituted by the following equation $$\phi_2 = \phi_1 + \Psi/2n \quad (41)$$

and the addition theorem is applied, then the following equation is derived.

$$F1/F2 = \cos(\Psi/2n) + \cot\phi_1 \sin(\Psi/2n) = D1/D2 \quad (42)$$

Where the above equation (42) is deformed then the aforementioned equation (21) is obtained. Where the above equation (41) is substituted by the equation (27), then the aforesaid equation (22) results.

Theoretically, the previously described equations (2), (3), (5), (8), (9), (11), (12), (15), (16), (17), (18), (19), (20), (23) and (24), are derived from the equations (25) and (26). The aforesaid equations (1), (4), (13) and (14) result from the equations (21), (22). Where the angle $\gamma$ has a small value, then the coil element is cylindrically formed of an original winding whose bent segments extend along the periphery of an imaginary columnar block form. Where the angle $\gamma$ indicates 180°, then the coil element becomes flat. Where the angle $\delta$ has a small value, then the original winding takes a cylindrical shape. Where the angle $\delta$ shows 180, then the original winding is ring-shaped.

As an example, a description is given of the method of fabricating the first coil element 16 of FIG. 4 from the cylindrical winding of FIG. 1.

Assuming $\gamma = 0$ and $\delta = 0$ in the equations (25) and (26), then the following equations result.

$$\sin(\gamma/2) \doteq \gamma/2$$

$$\sin(\delta/2) \doteq \delta/2$$

$$\sin\{(\pi/2n)\sin(\delta/2)\} \doteq (\pi/2n)\cdot(\delta/2)$$

$$\sin\{(\pi/n)\sin(\gamma/2)\} \doteq (\pi/n)\cdot(\gamma/2),$$

d1 is expressed by either of the following equations:

$$d1 = \frac{D1}{\sin\phi_2} \text{ or} \quad (43)$$

$$d1 = \frac{D2}{\sin\phi_1}$$

Since $\gamma = 0$ in the equation (22), the following equation is obtained:

$$\phi_2 = \phi_1 + (\pi/n)\cdot(\gamma/2) \approx \phi_1$$

Therefore, the previously described equation results:

$$\phi_1 = \phi_2 = \phi \quad (1)$$

Derived from the above equation (43) is the aforesaid equation:

$$d = D/\sin\phi \quad (2)$$

Since the distance l between the respective adjacent equal division points 24, 26 is expressed as $l = \pi D/2n$ as seen from FIG. 10 the following equation results:

$$\tan\phi = \frac{\left(\frac{\pi}{2n}D\right)}{L}$$

Therefore, the previously mentioned equation is obtained:

$$\phi = \tan^{-1}\left(\frac{\pi}{2n}\cdot\frac{D}{L}\right) \quad (3)$$

Thus, the aforesaid equation is established:

$$d = \frac{\frac{2n}{\pi}L\tan\phi}{\sin\phi} = \frac{2nL}{\pi\cos\phi} \quad (4)$$

Figure 14:
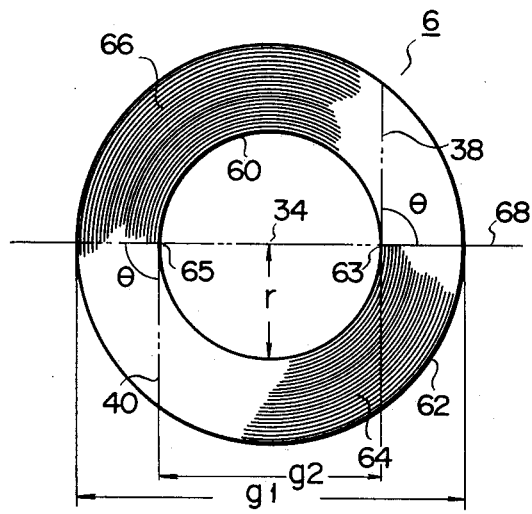
FIGS. 14 to 17 illustrate the steps of forming the coil element which has such a shape capable of being fitted around an imaginary columnar plane of FIG. 5 in accordance with a different method from that described above.
Figure 16:
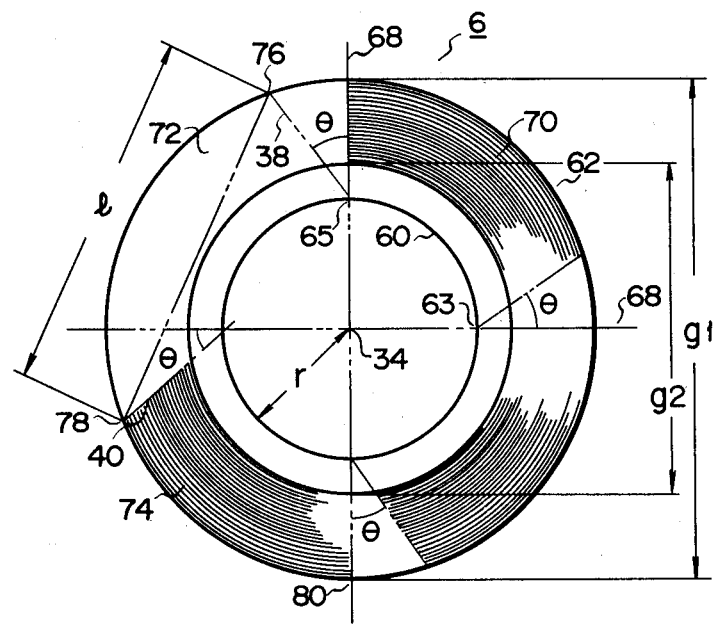

Description is now given with reference to FIGS. 14 to 17 of another method of fabricating a coil element 18 from the flat ring-shaped winding 6 of FIG. 2 by causing the bent said original winding 6 to extend along the periphery of an imaginary cylindrical block form. Where the coil element 18 is formed by bending the flat ring-shaped original winding 6, then it generally meets the practical purpose to make said coil element 18 by bending said flat ring-shaped original winding 6 along two or four bending lines 38, 40. The above-mentioned different method of fabricating the coil element 18 is favorably accepted where the bending angle $\theta$ and the positions of the bending lines 38, 40 are defined, in case the original winding 6 is bent along a 2n number (n denotes an integer of 1 or 2) of bending lines 38, 40.

Where the coil element 6 is fabricated from a flat ring-shaped original winding by causing the bent original winding to extend along the periphery of an imaginary cylindrical block form having a diameter D and height L as shown in FIG. 4, then the method of manufacturing said coil element 6 comprises the step of drawing a reference circle 60 with a radius r around the center 34 of the flat ring-shaped original winding 6 as shown in FIGS. 14 and 16. The radius r is defined by the following equation:

$$r = \pi D/4 = 0.78D \quad (44)$$

The diameter g1 of the outer periphery 62 of the flat winding 6 is determined from the radius r of the above-mentioned reference circle 60. Where the flat ring-shaped original winding 6 is bent along two bending lines 38, 40, then the outer diameter g1 is defined by the following equation:

$$g1 = L \quad (45)$$

Figure 15:
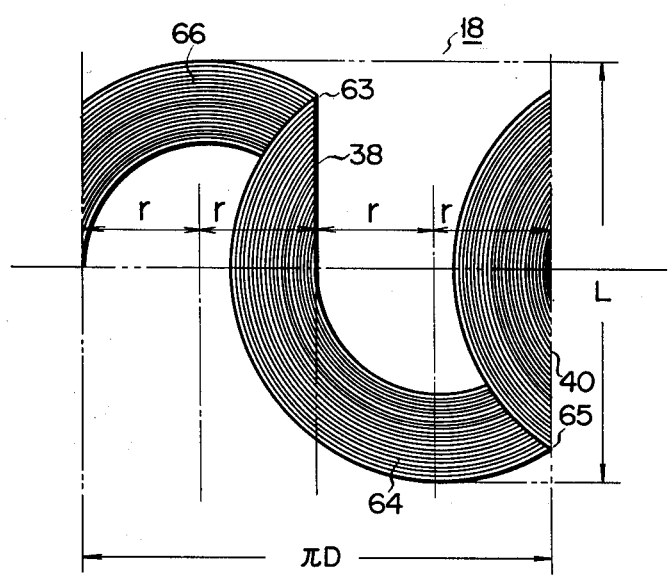

The reason why the above-equation (45) can be established is that as seen from FIG. 14 showing the flat ring-shaped original winding 6 bent along two bending lines 38, 40 and also from FIG. 15 indicating the deployment of the coil element 18 fabricated from said flat ring-shaped original winding 6, the vertical lengths (FIG. 15) defined by every two adjacent segments of said ring-shaped original winding 6 do not change at all, even when said original winding 6 is bent.

Where the flat original winding 6 is bent along four bending lengths, then the outer diameter g1 of the coil element 18 is defined by the following equation:

$$g1 = \sqrt{2(L^2 + r^2)} \quad (46)$$

This equation is later proved with reference to FIGS. 16 and 17. After the reference circle 60 is specified and the diameter g1 of the outer periphery 62 of the flat ring-shaped original winding 6 is defined, division points 63, 65 are set on the periphery of said reference circle 60 to divide said periphery into equal segments. Bending lines 38, 40 are prescribed which respectively pass through the aforesaid division points 63, 65 at an angle θ defined by the undermentioned equation (47) to a straight line 68 connecting said division points 63, 65 to the center 34 of said reference line 60

$$\theta = 180/2n (n=1 \text{ or } 2) \tag{47}$$

The bending lines 38, 40 divide the flat original winding 6 into equal segments 64, 66 or 68, 70, 72, 74.

Figure 17:
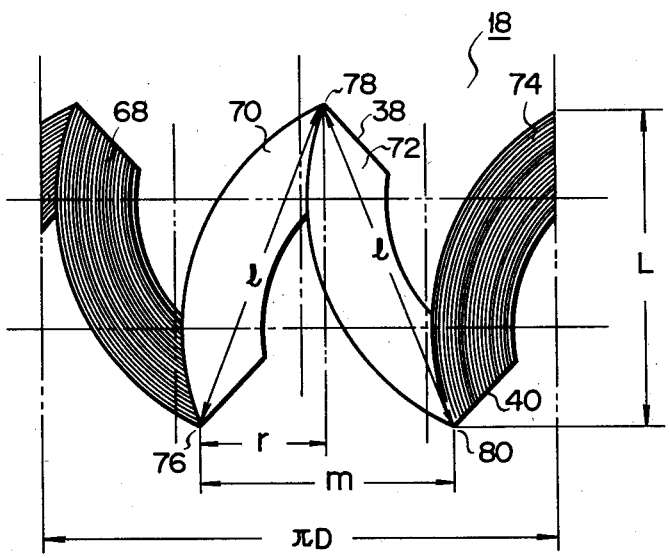

The flat ring-shaped original winding 6 is bent along the bending lines 38, 40 in such a manner that the respective segments of said bent winding 6 are directed downward and upward alternately along the periphery of an imaginary cylindrical block form, thereby providing a coil element 18 whose deployment chart is given in FIG. 15 or 17.

As apparent from the foregoing description, the inner diameter g2 of the flat-ring shaped original winding 6 is unrelated to any of the aforesaid equations, and consequently may be optionally selected as a rule. However, said inner diameter g2 should be made equal to or larger than the diameter 2r of the reference circle 60, that is, should have a relationship $2\gamma \leq g2$ relative to said diameter 2r. The reason for this is that in case of $g2 \leq 2r$, the bending lines would have to be set again on the outer periphery of the flat ring-shaped original winding 6.

Brief description is given of the above-mentioned equation $\theta = 180/2n$. Referring to FIG. 16, where the flat ring-shaped original winding 6 is bent along four bending lines, a distance l between the intersection points 76 and 78 which the bending lines 38 and 40 respectively define with the outer periphery 62 of the flat ring-shaped original winding 6 is expressed as follows.

$$l = \sqrt{2} \cdot g1/2$$

Where the original winding 6 is fabricated into the coil element 18, as shown in FIG. 17, then the aforesaid intersection points 76, 80 lie on the same periphery of an imaginary cylindrical block form. As seen from the illustrated steps of manufacturing the coil element 18, a distance m (FIG. 17) between said junctions 76, 80 is 2r. The three equidistantly arranged division points 76, 78, 80 collectively define an isosceles triangle, whose two facing sides have a length l alike, and whose base side m has a length 2r. Therefore, the height L of the imaginary cylindrical block form is expressed as $$L = \sqrt{l^2 - \left(\frac{m}{2}\right)^2} = \sqrt{l^2 - r^2}$$

Therefore, the following equations results:

$$L = \sqrt{\frac{g1^2}{2} - r^2} \tag{46}$$

$$2L^2 = g1^2 - 2r^2$$

$$g1 = \sqrt{2(L^2 + r^2)}$$

The values defined by the aforesaid numerous equations well serve the purpose, provided they substantially represent what is indicated, though they may not exactly satisfy the corresponding equations. It will be noted that the practical manufacturing steps are generally accompanied with errors, failing to let the abovementioned equations be fully satisfied, and that the magnitudes of such errors vary with the shape and size of an original winding and those of the resultant coil element.

As described above, the method of this invention can produce an electric motor coil element efficiently and at low cost. Further as apparent from the manufacturing steps, the respective turns of the original winding are regularly arranged, enabling magnetic energy to be effectively produced. Therefore, an electric motor constructed by assembling the coil elements embodying this invention is much more improved in various properties than has been possible in the past.

What is claimed is:

1. A method of manufacturing an electric motor coil element, comprising:

helically winding a single wire to form an original concentric winding of flat ring shape;

setting a 2n number (n=1, 2 . . . ) of equal division points on the periphery or the original winding to divide said periphery into an even number of substantially equal parts, said equal parts being located between adjacent equal division points;

specifying bending lines which pass through said equal division points at a predetermined angle to a given reference line; and bending the original winding along said bending lines to provide a plurality of segments of said original winding, said original winding being bent along said bending lines in such a manner that the respective adjacent bending lines project in opposite directions, thereby causing the upper and lower surfaces of respective adjacent segments of said original winding to be alternately exposed on the outer surface of an imaginary block form, thereby forming a motor coil element.

2. A method of manufacturing an electric motor coil element, comprising:

helically winding a single wire to form an original concentric winding of a truncated conical shape;

setting a 2n number (n=1, 2 . . . ) of equal division points on the periphery of the original winding to divide said periphery into an even number of substantially equal parts, said equal parts being located between adjacent equal division points;

specifying bending lines which pass through said equal division points at a predetermined angle to a given reference line; and bending the original winding along said bending lines to provide a plurality of segments of said original winding, said original winding being bent along said bending lines in such a manner that the respective adjacent bending lines project in opposite directions, thereby causing the upper and lower surfaces of respective adjacent segments of said original winding to be alternately exposed on the outer surface of an imaginary block form, thereby forming a motor coil element.

3. The method of claim 1 or 2, wherein the bending step comprises bending the original winding into segments such that the bent segments of the coil element extend along the periphery of an imaginary cylindrical block form.

4. The method of claim 1 or 2, wherein the formed coil element has a flat star shape, and the bent segments of said coil element are arranged on a flat plane in a region defined between two concentric circles.

5. The method of claim 1 or 2, wherein the bending step comprises bending the original winding into segments such that the bent segments of the formed coil element extend along the periphery of an imaginary truncated conical block form.

6. The method of claim 1, wherein the bent segments of the coil element extend along the periphery of the imaginary cylindrical block form having a diameter D and height L; the original winding has an outer diameter R1; the bending lines define a prescribed angle $\phi$ with reference lines connecting the equal division points to the center of said flat ring shaped original winding; the outer diameter R1 of said flat ring-shaped original winding is substantially defined by one of the following equations:

$$R1 = \frac{\pi D}{2n \sin\left(\frac{\pi}{2n}\right) \sin \phi} \text{ and}$$

$$R1 = \frac{L}{\sin\left(\frac{\pi}{2n}\right) \cdot \cos \phi}$$

and the bending angle $\phi$ is substantially determined by the following equation:

$$\phi = \tan^{-1}\left(\frac{\pi}{2n} \cdot \frac{D}{L}\right).$$

7. The method of claim 1, wherein the coil element has a flat star shape disposed in a region defined between an outer reference circle having a diameter K1 and an inner reference circle which is set concentric with said outer reference circle and has a diameter K2; the original winding of said star-shaped coil element assumes a flat ring shape having an outer diameter R1; the bending lines alternately defines angles $\phi_1$, $\phi_2$ along the periphery of said flat ring-shaped original winding with reference lines connecting the equal division points to the center of said original winding; the outer diameter R1 of said flat ring-shaped original winding is substantially defined by one of the following equations:

$$R1 = \frac{K1 \cos\left(\frac{\pi}{2n}\right)}{\sin \phi_2} \text{ and}$$

$$R1 = \frac{K2 \cos\left(\frac{\pi}{2n}\right)}{\sin \phi_1}$$

and the bending angles $\phi_1$, $\phi_2$ are substantially determined by the following equations:

$$\phi_1 = \tan^{-1}\left\{\frac{\sin\left(\frac{\pi}{n}\right)}{\frac{K1}{K2} - \cos\left(\frac{\pi}{n}\right)}\right\}$$

$$\phi_2 = \phi_1 + \frac{\pi}{n}.$$

8. The method of claim 1, wherein the coil element is fabricated from a flat ring-shaped original winding having a diameter R1, the bent segments of said flat ring-shaped original winding extending along the outer periphery of an imaginary truncated conical block from having an apical angle $\gamma$, larger diameter D1 and smaller diameter D2; the bending lines alternately define angles $\phi_1$, $\phi_2$ along to periphery of said flat ring-shaped original winding with reference lines connecting the equal division points to the center of said flat ring-shaped original winding; the outer diameter R1 of said flat ring-shaped original winding is substantially defined by one of the following equations:

$$R1 = \frac{D1}{2\sin \phi_2} \cdot \frac{1}{\sin\left(\frac{\gamma}{2}\right)} \cdot \frac{\sin\left\{\frac{\pi}{n}\sin\left(\frac{\gamma}{2}\right)\right\}}{\sin\left(\frac{\pi}{2n}\right)} \text{ and}$$

$$R1 = \frac{D2}{2\sin \phi_1} \cdot \frac{1}{\sin\left(\frac{\gamma}{2}\right)} \cdot \frac{\sin\left\{\frac{\pi}{n}\sin\left(\frac{\gamma}{2}\right)\right\}}{\sin\left(\frac{\pi}{2n}\right)}$$

and the bending angles $\phi_1$, $\phi_2$ are substantially determined by the following equations:

$$\phi_1 = \tan^{-1}\left[\frac{\sin\left\{\left(\frac{\pi}{n}\right) \cdot \sin\left(\frac{\gamma}{2}\right)\right\}}{\frac{D1}{D2} - \cos\left\{\left(\frac{\pi}{n}\right) \cdot \sin\left(\frac{\gamma}{2}\right)\right\}}\right]$$

$$\phi_2 = \phi_1 + \frac{\pi}{n} \sin\left(\frac{\gamma}{2}\right).$$

9. The method of claim 2 wherein the bent segments of the coil elements extend along the periphery of the imaginary cylindrical block form having a diameter D and height L; the original winding has a truncated conical shape which has a larger diameter d1 and whose imaginary apical portion defines an optional angle $\delta$, the bending lines define a prescribed angle with reference lines connecting the equal division points to an imaginary apical point; the larger diameter d1 of the truncated conical original winding is substantially defined by one of the following equations:

$$d1 = \frac{\pi D \sin\left(\frac{\delta}{2}\right)}{2n\sin\left(\left(\frac{\pi}{2n}\right)\sin\left(\frac{\delta}{2}\right)\right) \cdot \sin\phi} \text{ and}$$

$$d1 = \frac{L \sin\left(\frac{\delta}{2}\right)}{\sin\left(\left(\frac{\pi}{2n}\right)\sin\left(\frac{\delta}{2}\right)\right) \cos\phi}$$

and the bending angle $\phi$ is substantially determined by the following equation:

$$\phi = \tan^{-1}\left(\frac{\pi}{2n} \cdot \frac{D}{L}\right).$$

10. The method of claim 2, wherein the coil element has a flat star shape disposed in a region defined between an outer reference circle having a diameter K1 and an inner reference circle which is set concentric with said outer reference circle and has a diameter K2; the original winding of said star-shaped coil element assumes a truncated conical shape which has a larger diameter d1, and whose imaginary apical point defines an optionally selected angle $\delta$; the bending lines alternately define angles $\phi_1$, $\phi_2$ along the periphery of said truncated conical original winding with reference lines connecting the equal division points to said imaginary apical point; the larger diameter d1 of the truncated conical original winding is substantially defined by one of the following equations:

$$d1 = \frac{K1 \sin\left(\frac{\pi}{n}\right) \cdot \sin\left(\frac{\delta}{2}\right)}{2\sin\phi_2 \cdot \sin\left(\left(\frac{\pi}{2n}\right)\sin\left(\frac{\delta}{2}\right)\right)} \text{ and}$$

$$d1 = \frac{K2 \sin\left(\frac{\pi}{n}\right) \cdot \sin\left(\frac{\delta}{2}\right)}{2\sin\phi_1 \cdot \sin\left(\left(\frac{\pi}{2n}\right)\sin\left(\frac{\delta}{2}\right)\right)}$$

and the bending angles $\phi_1$, $\phi_2$ are substantially defined by the following equations:

$$\phi_1 = \tan^{-1}\left\{\frac{\sin\left(\frac{\pi}{n}\right)}{\frac{K1}{K2} - \cos\left(\frac{\pi}{n}\right)}\right\}$$

$$\phi_2 = \phi_1 + \frac{\pi}{n}.$$

11. The method of claim 2, wherein the coil element is fabricated from a truncated conical original winding which has a larger diameter d1 and whose apical point has an optionally selected angle $\delta$, the bent segments of said truncated conical original winding extending along the periphery of an imaginary truncated conical block form having an apical angle $\gamma$, larger diameter D1 and smaller diameter D2; the bending lines alternately define angles $\phi_1$, $\phi_2$ with reference lines along the periphery of said truncated conical original winding; the larger diameter d1 of said truncated conical original winding is substantially defined by one of the following equations:

$$d1 = \frac{D}{2\sin\phi_2} \cdot \frac{\sin\left(\frac{\delta}{2}\right)}{\sin\left(\frac{\gamma}{2}\right)} \cdot \frac{\sin\left(\frac{\pi}{n}\sin\left(\frac{\gamma}{2}\right)\right)}{\sin\left(\frac{\pi}{2n}\sin\left(\frac{\delta}{2}\right)\right)} \text{ and}$$

$$d1 = \frac{D2}{2\sin\phi_1} \cdot \frac{\sin\left(\frac{\delta}{2}\right)}{\sin\left(\frac{\gamma}{2}\right)} \cdot \frac{\sin\left(\frac{\pi}{n}\sin\left(\frac{\gamma}{2}\right)\right)}{\sin\left(\frac{\pi}{2n}\sin\left(\frac{\delta}{2}\right)\right)}$$

and the bending angles $\phi_1$, $\phi_2$ are substantially determined by the following equations:

$$\phi_1 = \tan^{-1}\left[\frac{\sin\left(\left(\frac{\pi}{n}\right)\sin\left(\frac{\gamma}{2}\right)\right)}{\frac{D1}{D2} - \cos\left(\left(\frac{\pi}{n}\right)\sin\left(\frac{\gamma}{2}\right)\right)}\right]$$

$$\phi_2 = \phi_1 + \frac{\pi}{n}\sin\left(\frac{\gamma}{2}\right)$$

12. A method of manufacturing a flat star-shaped electric motor coil element which comprises the steps of:

helically winding a single wire to form an original concentrically wound winding which has a cylindrical shape;

setting a 2n (n=1, 2 ... ) number of equal division points along the periphery of said original winding to divide said periphery into an even number of equal parts, said equal parts being located between adjacent equal division points;

providing bending lines which pass through said equal division points at specified angles to give reference lines; and bending the original cylindrically shaped winding along said bending lines to provide a plurality of equally divided segments of the original winding, said original winding being bent along said bending lines in such a manner that the respective adjacent bending lines alternately project in opposite directions and said segments lie substantially in a flat plane to form a flat star-shaped coil element disposed in a region defined between a reference outer circle of diameter K1 and a reference inner circle of K2.

13. The method of manufacturing an electric motor coil element according to claim 12, wherein the coil element is fabricated from a cylindrical original winding having a diameter d in a flat star form which is disposed in a region defined between an outer reference circle having a diameter K1 and an inner reference circle which is set concentric with said outer reference circle and has a diameter K2; the bending lines alternately define angles $\phi_1$, $\phi_2$ with reference lines which are set in parallel with the axis of said cylindrical original winding and pass through the equal division points; the diameter d of said cylindrical original winding is substantially defined by one of the following equations:

$$d = \frac{nK1 \sin\left(\frac{\pi}{n}\right)}{\pi \sin \phi_2} \text{ and}$$

$$d = \frac{nK2 \sin\left(\frac{\pi}{n}\right)}{\pi \sin \phi_1}$$

and the bending angles $\phi_1$, $\phi_2$ are substantially determined by the following equations:

$$\phi_1 = \tan^{-1}\left\{\frac{\sin\left(\frac{\pi}{n}\right)}{\frac{K1}{K2} - \cos\left(\frac{\pi}{n}\right)}\right\}$$

$$\phi_2 = \phi_1 + \frac{\pi}{n}.$$

14. A method of manufacturing an electric motor coil element which is formed of two bent segments extending along the periphery of an imaginary cylindrical block form having a height L and diameter D, and wherein the two segments are fabricated by the steps of:
closely winding a single wire to provide a flat ring-shaped original winding having an outer diameter g1;
specifying a reference circle which is set concentric with said flat ring-shaped original winding and has a radius r;
setting two division points on the periphery of said reference circle to divide said periphery into two equal parts;
providing bending lines which pass through said equal division points at a prescribed angle $\theta$ to reference lines connecting the equal division points to the center of an imaginary circle; and
bending the two equal segments of said flat ring-shaped original winding in such a manner that said bending lines project in different directions.

15. The method of claim 14, wherein the radius r of the reference circle is substantially set at 0.78 D; the bending angle $\theta$ is defined to be substantially 90°; and the outer diameter g1 of the flat ring-shaped original winding is made substantially equal to the height L of an imaginary cylindrical block form.

16. A method of manufacturing an electric motor coil element which is formed of four bent segments extending along the periphery of an imaginary cylindrical block form and said four segments being fabricated by the steps of:
closely winding a single wire to provide a flat ring-shaped original winding having an outer diameter g1;
specifying a reference circle which is set concentric with said flat ring-shaped original winding and has a radius r;
setting four division points on the periphery of said reference circle to divide said periphery into four equal parts;
providing bending lines which pass through said equal division points at a prescribed angle $\theta$ to reference lines connecting the equal division points to the center of the standard circle; and
bending the four equal segments of said flat ring-shaped original winding in such a manner that said bending lines project in alternately different directions.

17. The method of claim 16, wherein the radius r of the reference circle is set substantially at 0.78 D; the bending angle $\theta$ is chosen to be substantially 45°; and the outer diameter g1 of said flat ring-shaped original winding is chosen to be substantially $\sqrt{2(L^2+r^2)}$.

18. A method of manufacturing an electric motor coil element which comprise the steps of:
winding a single wire concentrically and helically on the same plane to provide a flat ring-shaped original winding having an outer diameter g1;
setting a reference circle about the center of said flat ring-shaped original winding with a radius r;
setting equal division points on the periphery of said reference circle to divide said periphery into two or four equal parts;
providing bending lines which pass through said equal division points at a prescribed angle $\theta$ to reference lines connecting the equal division points to the center of said reference circle;
bending the flat ring-shaped original winding in such a manner that the bending lines alternately project in the opposite directions; and
causing the bent said original winding to extend along the periphery of an imaginary cylindrical block form having a diameter D.

19. The method of manufacturing an electric motor coil element according to claim 18, wherein, two equal division points are set and the radius r of the reference circle is set at substantially 0.78 D; the bending angle $\theta$ is chosen to be substantially 90°; and the outer diameter g1 of said flat ring-shaped original winding is made substantially equal to the height L of the imaginary cylindrical block form.

20. The method of manufacturing an electric motor coil element according to claim 18, wherein, four equal division points are set and the radius r of the reference circle is set at substantially 0.78 D; the bending angle $\theta$ is chosen to be substantially 45°; and the outer diameter g1 of said flat ring-shaped original winding is defined to be substantially $\sqrt{2(L^2+r^2)}$.

21. An electric motor coil element comprising an original winding bent into segments, the original winding being formed from a single wire wound into a flat ring-shaped original winding, said bent segments being arranged such that the upper and lower planes of the respective adjacent bent segments are alternately exposed on the outer surface of an imaginary block form, manufactured by the steps of:
helically winding a single wire into a flat ring shape to provide a flat ring-shaped original winding;
setting a 2n number (n=1, 2 ...) of equal division points on the periphery of the original winding to divide said periphery into an even number of substantially equal parts, said equal parts being located between adjacent equal division points;

specifying respective bending lines which pass through the equal division points at a prescribed angle to a given reference line; and bending the original winding along said bending lines into a plurality of bent segments in such a manner that the respective adjacent bending lines project in the opposite directions, thereby causing the upper and lower planes of the respective adjacent bent segments to be alternately exposed on the outer surface of an imaginary block form and thereby forming said motor coil element.

22. An electric motor coil element comprising an original winding bent into segments, the original winding being formed from a single wire wound into a truncated conical-shaped original winding, said bent segments being arranged such that the upper and lower planes of the respective adjacent bent segments are alternately exposed on the outer surface of an imaginary block form, manufactured by the steps of:

helically winding a single wire into a flat ring shape to provide a truncated conical-shaped original winding;

setting a 2n number (n=1, 2 . . . ) of equal division points on the periphery of the original winding to divide said periphery into an even number of substantially equal parts, said equal parts being located between adjacent equal division points;

specifying respective bending lines which pass through the equal division points at a prescribed angle to a given reference line; and bending the original winding along said bending lines into a plurality of bent segments in such a manner that the respective adjacent bending lines project in the opposite directions, thereby causing the upper and lower planes of the respective adjacent bent segments to be alternately exposed on the outer surface of an imaginary block form and thereby forming said motor oil element.

23. The electric motor coil element made by the method of claim 21 or 22, wherein the bent segments of the final coil element extend along the periphery of an imaginary cylindrical block form.

24. The electric motor coil element made by the method of claim 21 or 22, wherein the final coil element has a flat star shape, and the bent segments of said coil element are arranged on a flat plane in a region defined between two concentric circles.

25. The electric motor coil element made by the method of claim 21 or 22, wherein the bent segments of the final coil element extend along the periphery of an imaginary truncated conical block form.

26. The electric coil element made by the method of claim 21, wherein the bent segments of the coil element extend along the periphery of the imaginary cylindrical block form having a diameter D and height L; the original winding has a flat ring shape having an outer diameter R1; the bending lines define a prescribed angle $\phi$ with reference lines connecting the equal division points to the center of said flat ring shaped original winding; the outer diameter R1 of said flat ring-shaped original winding is substantially defined by one of the following equations:

$$R1 = \frac{\pi D}{2n \sin\left(\frac{\pi}{2n}\right) \sin\phi} \text{ and}$$

$$R1 = \frac{L}{\sin\left(\frac{\pi}{2n}\right) \cdot \cos\phi}$$

and the bending angle $\phi$ is substantially determined by the following equation:

$$\phi = \tan^{-1}\left(\frac{\pi}{2n} \cdot \frac{D}{L}\right).$$

27. The electric motor coil element made by the method of claim 21 wherein the bent segments of the coil element extend along the periphery of the imaginary cylindrical block form having a diameter D and height L; the original winding of said coil element has a truncated conical shape which has a larger diameter d1 and whose imaginary apical portion defines an optional angle $\delta$; the bending lines define a prescribed angle with reference lines connecting the equal division points to an imaginary apical point; the larger diameter d1 of the truncated conical original winding is substantially defined by one of the following equations:

$$d1 = \frac{\pi D \sin\left(\frac{\delta}{2}\right)}{2n\sin\left\{\left(\frac{\pi}{2n}\right)\sin\left(\frac{\delta}{2}\right)\right\} \cdot \sin\phi} \text{ and}$$

$$d1 = \frac{L \sin\left(\frac{\delta}{2}\right)}{\sin\left\{\left(\frac{\pi}{2n}\right)\sin\left(\frac{\delta}{2}\right)\right\} \cos\phi}$$

and the bending angle $\phi$ is substantially determined by the following equation:

$$\phi = \tan^{-1}\left(\frac{\pi}{2n} \cdot \frac{D}{L}\right).$$

28. The electric motor coil element made by the method of claim 21, wherein the final coil element has a star shape disposed in a region defined between a reference outer circle having a diameter K1 and a reference inner circle which is set concentric with said reference outer circle and has a diameter K2; the original winding assumes a cylindrical shape having a diameter d; the prescribed bending lines alternately define bending angles $\phi_1$, $\phi_2$ along the periphery of said cylindrical original winding with reference lines which are set in parallel with the axis of the cylindrical original winding and pass through the equal division points; the diameter d of said cylindrical original winding is substantially define by one of the following equations:

$$d = \frac{nK1 \sin\left(\frac{\pi}{n}\right)}{\pi \sin \phi_2} \text{ and}$$

$$d = \frac{nK2 \sin\left(\frac{\pi}{n}\right)}{\pi \sin \phi_1}$$

and the bending angles $\phi_1$, $\phi_2$ are substantially determined by the following equations:

$$\phi_1 = \tan^{-1}\left\{\frac{\sin\left(\frac{\pi}{n}\right)}{\frac{K1}{K2} - \cos\left(\frac{\pi}{n}\right)}\right\}$$

$$\phi_2 = \phi_1 + \frac{\pi}{n}.$$

29. The electric motor coil element made by the method of claim 21, wherein the final coil element has a flat star shape disposed in a region defined between an outer reference circle having a diameter K1 and an inner reference circle which is set concentric with said outer standard circle and has a diameter K2; the original winding assumes a flat ring shape having an outer diameter R1; the bending lines alternately define angles $\phi_1$, $\phi_2$ along the periphery of said flat ring-shaped original winding with reference lines connecting the equal division points to the center of said original winding; the outer diameter R1 of said flat ring-shaped original winding is substantially defined by one of the following equations:

$$R1 = \frac{K1 \cos\left(\frac{\pi}{2n}\right)}{\sin \phi_2} \text{ and}$$

$$R1 = \frac{K2 \cos\left(\frac{\pi}{2n}\right)}{\sin \phi_1}$$

and the bending angles $\phi_1$, $\phi_2$ are substantially determined by the following equations:

$$\phi_1 = \tan^{-1}\left\{\frac{\sin\left(\frac{\pi}{n}\right)}{\frac{K1}{K2} - \cos\left(\frac{\pi}{n}\right)}\right\}$$

$$\phi_2 = \phi_1 + \frac{\pi}{n}.$$

30. The electric motor coil element made by the method of claim 21, wherein the coil element has a flat star shape disposed in a region defined between an outer reference circle having a diameter K1 and an inner reference circle which is set concentric with said outer reference circle and has a diameter K2; the original winding assumes a truncated conical shape which has a larger diameter d1, and whose imaginary apical point defines an optionally selected angle $\delta$; the bending lines alternately define angles $\phi_1$, $\phi_2$ along the periphery of said truncated conical original winding with reference lines connecting the equal division points to said imaginary apical point; the larger diameter d1 of the truncated conical original winding is substantially defined by one of the following equations:

$$d1 = \frac{K1 \sin\left(\frac{\pi}{n}\right) \cdot \sin\left(\frac{\delta}{2}\right)}{2\sin \phi_2 \cdot \sin\left\{\left(\frac{\pi}{2n}\right) \sin\left(\frac{\delta}{2}\right)\right\}} \text{ and}$$

$$d1 = \frac{K2 \sin\left(\frac{\pi}{n}\right) \cdot \sin\left(\frac{\delta}{2}\right)}{2\sin \phi_1 \cdot \sin\left\{\left(\frac{\pi}{2n}\right) \sin\left(\frac{\delta}{2}\right)\right\}}$$

and the bending angles $\phi_1$, $\phi_2$ are substantially defined by the following equations:

$$\phi_1 = \tan^{-1}\left\{\frac{\sin\left(\frac{\pi}{n}\right)}{\frac{K1}{K2} - \cos\left(\frac{\pi}{n}\right)}\right\}$$

$$\phi_2 = \phi_1 + \frac{\pi}{n}.$$

31. The electric motor coil element made by the method of claim 21, wherein the final coil element is fabricated from a flat ring-shaped original winding having a diameter R1, the bent segments of said flat ring-shaped original winding extending along the outer periphery of an imaginary truncated conical block form having an apical angle $\gamma$, larger diameter D1 and smaller diameter D2; the bending lines alternately define angles $\phi_1$, $\phi_2$ along to periphery of said flat ring-shaped original winding with reference lines connecting the equal division points to the center of said flat ring-shaped original winding; the outer diameter R1 of said flat ring-shaped original winding is substantially defined by one of the following equations:

$$R1 = \frac{D1}{2\sin \phi_2} \cdot \frac{1}{\sin\left(\frac{\gamma}{2}\right)} \cdot \frac{\sin\left\{\frac{\pi}{n} \sin\left(\frac{\gamma}{2}\right)\right\}}{\sin\left(\frac{\pi}{2n}\right)} \text{ and}$$

$$R1 = \frac{D2}{2\sin \phi_1} \cdot \frac{1}{\sin\left(\frac{\gamma}{2}\right)} \cdot \frac{\sin\left\{\frac{\pi}{n} \sin\left(\frac{\gamma}{2}\right)\right\}}{\sin\left(\frac{\pi}{2n}\right)}$$

and the bending angles $\phi_1$, $\phi_2$ are substantially determined by the following equations:

$$\phi_1 = \tan^{-1} \left[ \frac{\sin\left\{\left(\frac{\pi}{n}\right) \cdot \sin\left(\frac{\gamma}{2}\right)\right\}}{\frac{D1}{D2} - \cos\left\{\left(\frac{\pi}{n}\right) \cdot \sin\left(\frac{\gamma}{2}\right)\right\}} \right]$$

$$\phi_2 = \phi_1 + \frac{\pi}{n} \sin\left(\frac{\gamma}{2}\right).$$

32. The electric motor coil element made by the method of claim 21, wherein the final coil element is fabricated from a truncated conical original winding which has a larger diameter d1 and whose apical point has an optionally selected angle δ, the bent segments of said truncated conical original winding extending along the periphery of an imaginary truncated conical block form having an apical angle γ, larger diameter D1 and smaller diameter D2; the bending lines alternately define angles $\phi_1$, $\phi_2$ with reference lines along the periphery of said truncated conical original winding; the larger diameter d1 of said truncated conical original winding is substantially defined by one of the following equations:

$$d1 = \frac{D1}{2\sin\phi_2} \cdot \frac{\sin\left(\frac{\delta}{2}\right)}{\sin\left(\frac{\gamma}{2}\right)} \cdot \frac{\sin\left\{\frac{\pi}{n}\sin\left(\frac{\gamma}{2}\right)\right\}}{\sin\left\{\frac{\pi}{2n}\sin\left(\frac{\delta}{2}\right)\right\}} \quad \text{and}$$

$$d1 = \frac{D2}{2\sin\phi_2} \cdot \frac{\sin\left(\frac{\delta}{2}\right)}{\sin\left(\frac{\gamma}{2}\right)} \cdot \frac{\sin\left\{\frac{\pi}{n}\sin\left(\frac{\gamma}{2}\right)\right\}}{\sin\left\{\frac{\pi}{2n}\sin\left(\frac{\delta}{2}\right)\right\}}$$

and the bending angles $\phi_1$, $\phi_2$ are substantially determined by the following equations:

$$\phi_1 = \tan^{-1} \left[ \frac{\sin\left\{\left(\frac{\pi}{n}\right) \sin\left(\frac{\gamma}{2}\right)\right\}}{\frac{D1}{D2} - \cos\left\{\left(\frac{\pi}{n}\right) \sin\left(\frac{\gamma}{2}\right)\right\}} \right]$$

$$\phi_2 = \phi_1 + \frac{\pi}{n} \sin\left(\frac{\gamma}{2}\right).$$

33. A flat star-shaped electric motor coil element comprising an original winding bent into segments, the original winding being formed from a single wire wound into an original winding of cylindrical shape, said bent segments being arranged such that the upper and lower planes of the respective adjacent bent segments are alternately exposed on the outer surface of an imaginary block form, manufactured by the steps of:

helically winding a single wire into a flat ring shape to provide an original winding of cylindrical shape;

setting a 2n number (n=1, 2 . . . ) of equal division points on the periphery of the original winding to divide said periphery into an even number of substantially equal parts, said equal parts being located between adjacent equal division points;

specifying respective bending lines which pass through the equal division points at a prescribed angle to a given reference line; and bending the original winding along said bending lines into a plurality of bent segments in such a manner that the respective adjacent bending lines project in the opposite directions and the segments are arranged on a flat plane in a region defined between two concentric circles, thereby causing the upper and lower planes of the respective adjacent bent segments to be alternately exposed in said substantially flat plane to thereby form said star-shaped motor coil element.

* * * * *